Oct. 23, 1934.  F. V. GEIER ET AL  1,978,347
PROFILING MACHINE
Filed Dec. 12, 1930  5 Sheets-Sheet 1

Inventor
FREDERICK V. GEIER
WALTER D. ARCHEA
By Parsons
Attorney

Inventor
FREDERICK V. GEIER
WALTER D. ARCHEA
By
Attorney

Patented Oct. 23, 1934

1,978,347

UNITED STATES PATENT OFFICE 1,978,347

PROFILING MACHINE

Frederick V. Geier and Walter D. Archea, Cincinnati, Ohio, assignors to The Cincinnati Milling Machine Company, Cincinnati, Ohio, a corporation of Ohio Application December 12, 1930, Serial No. 501,906

23 Claims. (Cl. 90—19)

This invention relates to milling machines and more particularly to an improved hydraulically actuated profiling machine.

One of the objects of this invention is to provide a profiling machine in which relative movement between a tool and a work piece may be obtained at variable rates and in a plurality of directions and all under the control of a single operating member.

Another object of this invention is to provide a milling machine having a saddle and a table with a single control lever for selectively determining the rate and direction of movement of either support.

A further object of this invention is to provide a profiling machine having two supports relatively movable transversely to one another with hydraulic means for actuating either or both supports at selective rates and in various directions and unitary means for determining the rate and direction of movement of either support or of both supports simultaneously.

Other objects and advantages of the present invention should be readily apparent by reference to the following specification considered in conjunction with the accompanying drawings, illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 16 is a perspective view showing the coupling of the common control lever to control valve of each slide.

Figure 1:
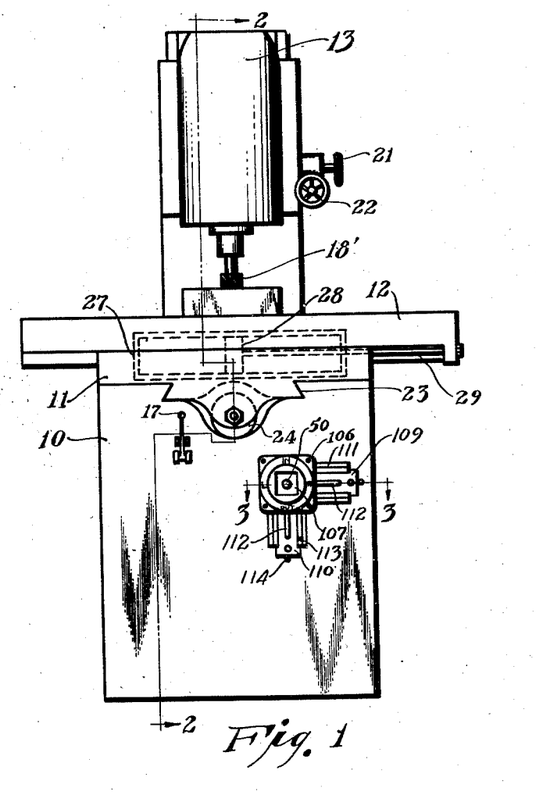
Figure 1 is a front elevation of a machine embodying the principles of this invention.

The reference numeral 10 indicates the column of a milling machine having slidably supported thereon a saddle 11 which in turn supports a table 12 for movement transversely of the saddle. A vertical spindle carrier 13 is slidably mounted in an upper part of the column in overhanging relation with respect to the work table 12 for supporting a cutter 18' to effect stock removal from work carried by the table. The cutter spindle 13' is adapted to be driven from a prime mover, such as 14, located in the base of the machine through a suitable transmission indicated generally by the reference numeral 15 having a clutch member, such as 15', splined on sleeve 16 to the other end of which is keyed the bevel gear 16'. The sleeve is mounted for free rotation on the shaft 65. The clutch is movable into engagement with the clutch element 15" by the starting lever 17, located at the front of the machine and connected to the clutch through a shifter rod 17'. Inward movement of the lever will cause rotation of the spindle and the cutter 18' supported thereby while outward movement will disconnect the clutch to stop rotation of the parts.

The spindle carrier is vertically adjustable with respect to the work support 12 and for this purpose is provided with a rack portion 18 having a pinion 19, secured to the horizontal shaft 20, meshing therewith, the shaft being provided with an external operating member 21. An additional manual control 22 may be provided whereby the operator may conveniently adjust the spindle carrier from the front of the machine, as well as from the side thereof.

The saddle 11 is mounted on horizontal guideways 23 for movement toward and from the column of the machine and is adapted to be power reciprocated by hydraulic means including a cylinder 24 having a piston 25 reciprocably mounted therein and connected to the saddle 11 by means of the piston rod 26. The saddle in turn supports a cylinder 27 having a piston 28 slidably mounted therein and connected to the table 12 by means of the piston rod 29.

Figures 4, 5, 6, 7, 8, 9, 12:
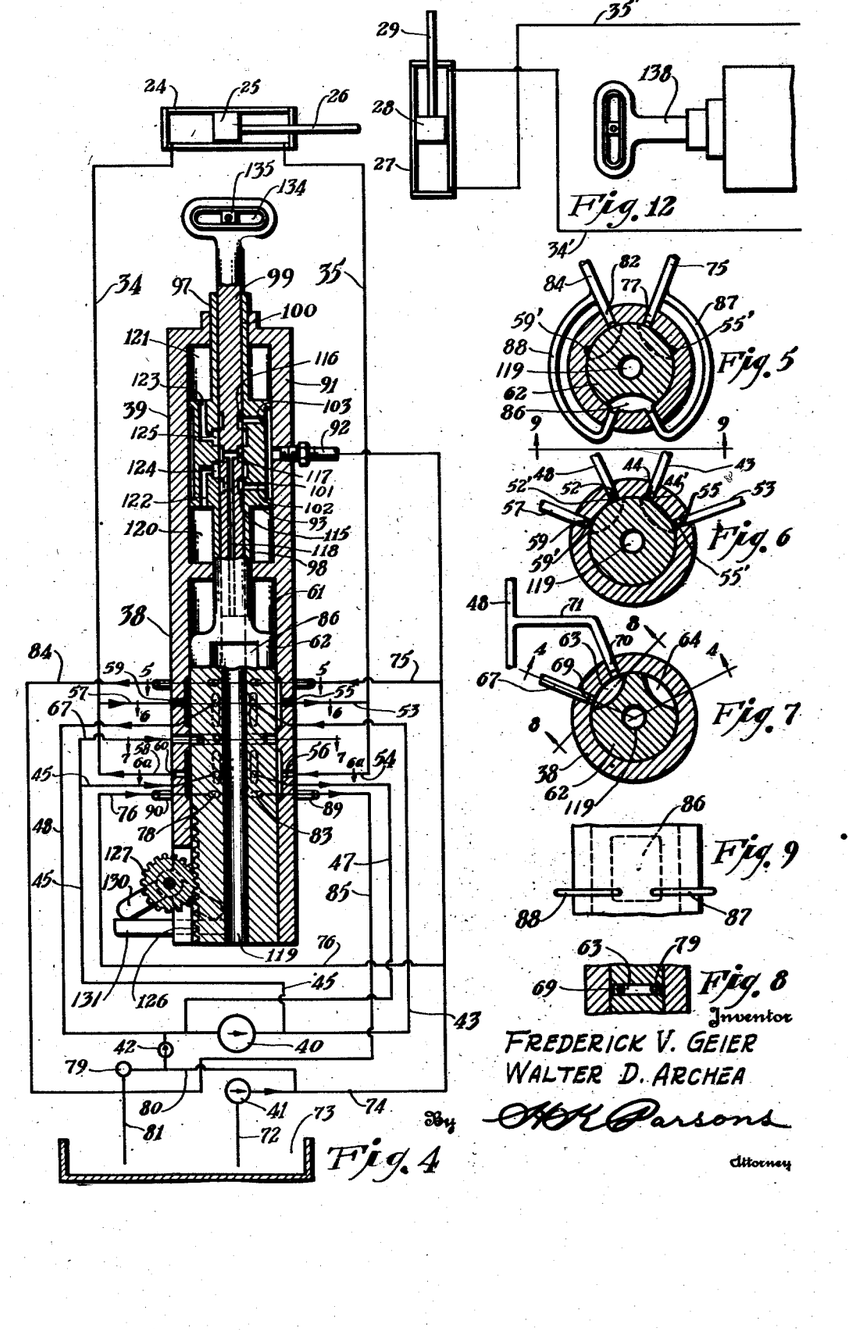
Figure 4 is a section through the saddle rate and direction control valve as viewed on the line 4—4 of Figure 7.
Figure 5 is a section on the line 5—5 of Figure 4.
Figure 6 is a section on the line 6—6 of Figure 4.
Figure 7 is a section on the line 7—7 of Figure 4.
Figure 8 is a detail section on the line 8—8 of Figure 7.
Figure 9 is a detail view showing the short circuiting connection for the rapid traverse pump.
Figure 12 is a diagrammatic view showing the connections to the table operating cylinder.
Figures 6A, 11, 13, 14, 15:
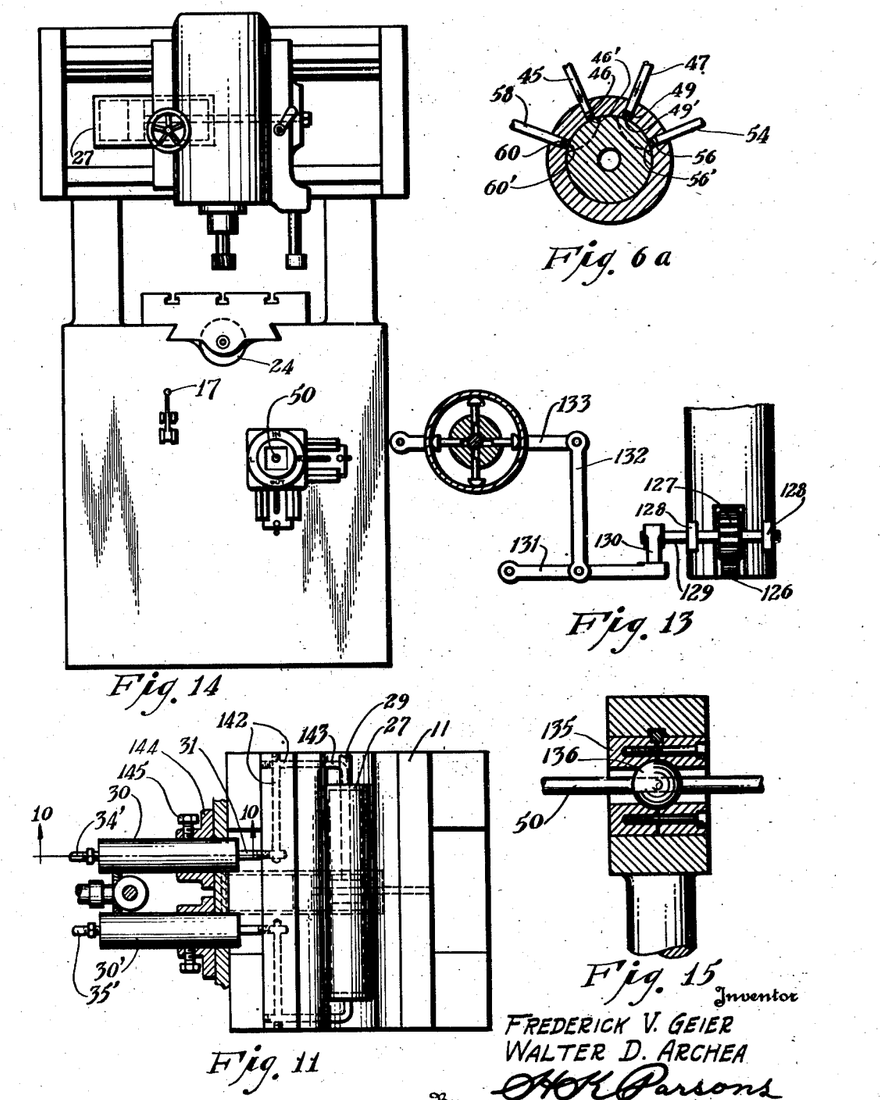
Figure 6A is a section on the line 6a—6a of Figure 4.
Figure 11 is a plan view of the saddle with the table removed.
Figure 13 is a view showing the pump displacement variating mechanism.
Figure 14 is a modified view of the invention.
Figure 15 is a section on the line 15—15 of Figure 2.
Figures 17, 18:
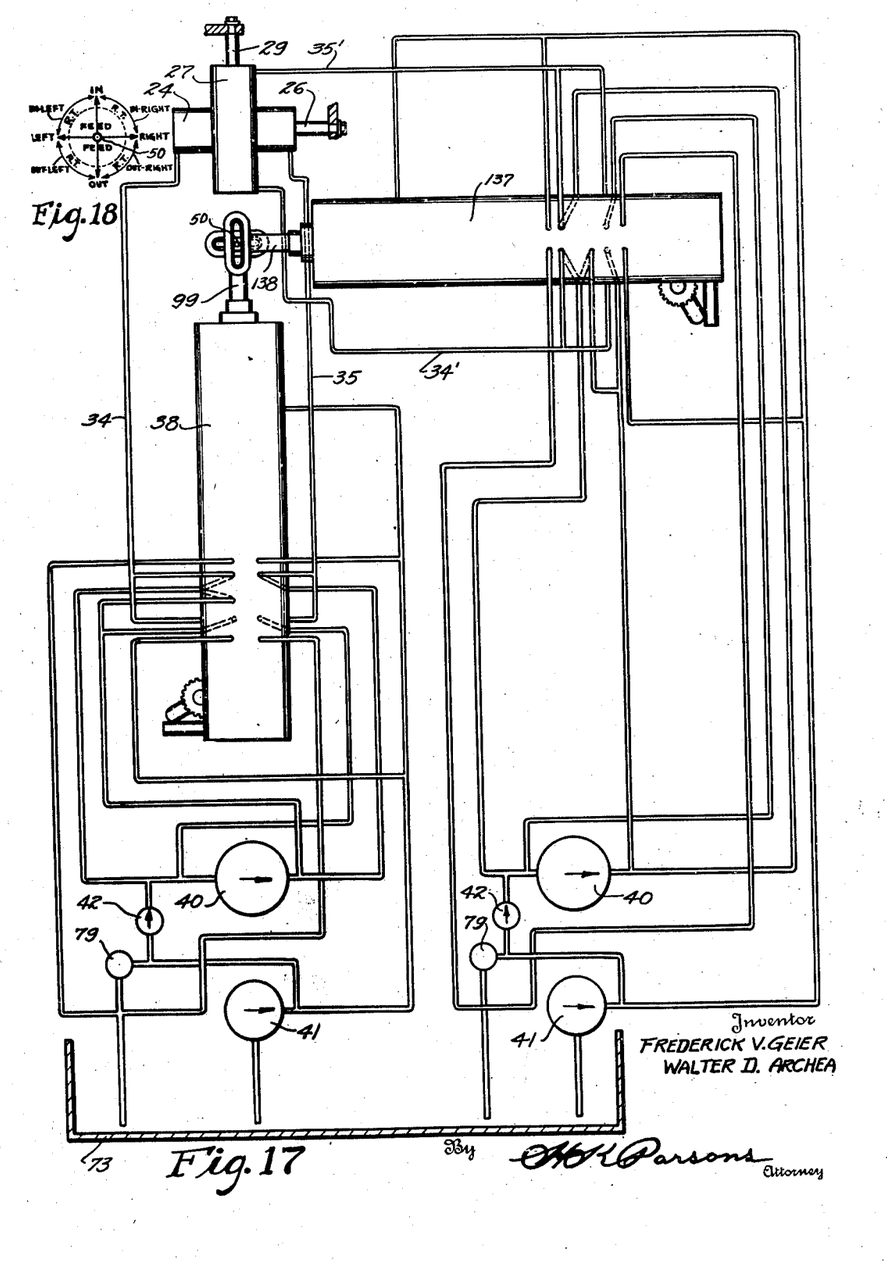
Figure 17 is a view showing the arrangement of the two hydraulic systems for joint control by a single lever.
Figure 18 is a diagrammatic view showing the range of movement of the control lever and the rates and directions of movement effected thereby in each quadrant of the range.

A separate hydraulic system has been provided for each slide, one of which is illustrated in Figure 4, whereby each slide may be moved at its own particular rate independent of the other. Since the hydraulic systems are the same, only one will be shown and described in detail, the general arrangement of the two systems for joint control by a single lever being shown in Figure 17. Such a system comprises generally a main control valve 38, an hydraulic motor 39 for power actuating the valve plunger, and a plurality of pumps including a variable displacement feed pump 40, a rapid traverse pump 41, and a booster or make-up pump 42. The variable delivery pump delivers fluid at high pressure and in small quantities to the channel 43 which leads to the pressure port 44, (Figure 6) and to the channel 45 which leads to the pressure port 46 (Figure 6A). A pair of return lines 47 and 48 extend from the main valve to the in-take side of the pump, the channel 47 being connected to the port 49 (Figure 6A) and the channel 48 being connected to the port 52 (Figure 6). The cylinder 24 for the saddle is connected to its control valve through main channels 34 and 35, the channel 35 terminating in branch channels 53 and 54 connected respectively to ports 55 and 56 in the control valve and the channel 34 terminating in branch lines 57 and 58 connected respectively to ports 59 and 60 of the valve.

By reference to Figures 4 and 6 it will be noted that each of the ports 55, 44, 52 and 59 communicate respectively, with longitudinal grooves 55′, 44′, 52′ and 59′ formed on the interior wall 61 of the valve housing and by reference to Figure 6A it will be noted that the ports 56, 49, 46 and 60 also terminate in similar longitudinal grooves. Slidably mounted in the valve 38 is the valve plunger 62, which, as shown in Figure 7, is provided with arcuate grooves 63 and 64 lying in the same plane. The valve, as shown in Figure 4, is in a neutral position, that is, all power is disconnected from the saddle operating cylinder 24 and since the feed pump 40 is constantly driven from the main driving shaft 65 through the belt 66 undue pressure will build up in channels 43 and 44, which is undesirable, and accordingly means have been provided for short circuiting the pump during non-working periods. To this end the pressure channel 45 is provided with a branch line 67, which, as shown in Figure 7, is connected to the port 69. A second port 70 formed in the valve in the same plane with the port 69 connects with the return channel 48 through the branch line 71. When the valve plunger 62 is now in neutral position it will be short circuited through the channel 45, branch line 67, port 69, groove 63, port 70, branch line 71 and return line 48. The relation of the groove 63 in the valve plunger to the ports formed in the housing for establishing connection between them is more clearly illustrated in Figure 8.

Movement of the valve plunger upward will effect movement of the piston 25 to the left, as viewed in Figure 4, while movement of the valve plunger downward will effect movement of the piston 25 to the right. Upon movement of the valve upward the groove 63 will connect together ports 59 and 52, and the port 44 with the port 55. The purpose of the longitudinal grooves 55′, 44′, 52′ and 59′ is to make possible the aforesaid connection of the ports immediately upon sufficient upward movement to close off the ports 69 and 70 and to maintain connection during a predetermined length of upward movement, during which movement the feed rate is increased by a mechanism to be described later.

Upon sufficient upward movement to establish connection between the aforesaid pairs of ports pressure will flow from the pump 40 through the channel 43, port 44, groove 44′, arcuate groove 64, groove 55′, port 55 and branch channel 53 to the main channel 35 leading to the saddle operating cylinder 24 causing movement of the saddle inward or toward the column. Simultaneously the opposite end of the cylinder will be connected to the in-take of the pump 40 through main channel 34, branch channel 57, port 59, groove 59′, arcuate groove 63, groove 52′, port 52 and channel 48.

Downward movement of the valve from its neutral position will cause a reverse movement of the saddle and in this case pressure from the pump 40 will flow through the channel 45 to the port 46, longitudinal groove 46′, arcuate groove 63, longitudinal groove 60′, port 60 and branch line 58 to the main channel 34 thereby admitting pressure to the left end of the cylinder 24, as viewed in Figure 4, and the fluid in the right end of the cylinder will return to the feed pump through the main channel 35, branch line 54, port 56, longitudinal groove 56′, arcuate groove 64, longitudinal groove 49′, port 49 to the return channel 47. Therefore, it should now be apparent that if the valve plunger 62 is moved upward from its neutral position, the saddle will be moved inward or toward the column and if moved downward from its neutral position, the saddle will move at a feed rate outward or away from the column.

Means have also been provided for imparting rapid traverse movements to the saddle in either direction and for this purpose the rapid traverse pump 41 has been provided having an in-take 72 from the reservoir 73 located in the base of the machine and a pressure channel 74 which divides into two branches 75 and 76, the branch 75 leading to the port 77 (Figure 5) and the branch 76 leading to the port 78 in the main valve. The rapid traverse pump 41 is provided with a relief valve 79 connected to the pressure line 74 through the branch line 80 whereby upon excessive pressure building up in the channel 74 the pump will short circuit to the reservoir through channel 81. This pump also serves through branch line 80 to supply the booster or make-up pump 42 which in turn supplies make-up to the feed circuit through channel 48. Since the rapid traverse pump takes fluid directly from the reservoir the return for that pump is also connected directly to the reservoir. The return rapid traverse ports 82 and 83 in the valve are connected to the reservoir through return channels 84 and 85 respectively.

Additional means have been provided for short circuiting the rapid traverse pump during non-working periods and in all feed positions of the valve and to this end the valve plunger 62 is provided with a pair of elongated pockets 86 which are so positioned on the valve plunger as to connect the pressure and return channels 75 and 84 through pipes 87 and 88 and pockets 86. With the valve in neutral position, as shown in Figure 9, the upper pocket extends downward a sufficient distance to establish this short circuiting connection while the lower pocket is so positioned as to extend upward a sufficient distance to short circuit the channels 89 and 90. From this it should be seen that upon upward movement of the valve the upper pocket 86 will be moved out of short circuiting connection with the channels 87 and 88 while the lower pocket will maintain such connection between channels 89 and 90 during the full extent of the upward feed movement Similarly, upon downward movement of the valve plunger the lower pocket 86 will be moved from short circuiting connection between the channels 89 and 90 but the upper pocket 86 will maintain short circuiting connection between the channels 87 and 88 during the full extent of the downward feed movement of the valve. At the completion of either the upward or the downward feed movement of the valve the pockets 86 will cease to function and the arcuate grooves 63 and 64 will, upon continued upward movement of the valve, be moved into registry with the port 82 and the groove 59' and the port 77 will be connected with the groove 55', it being noted upon examination of Figure 4 that the grooves 55' and 59' extend further upward than the grooves 52' and 44' while in the same manner the grooves 56' and 60' extend further downward than the grooves 46' and 49'. Upon registry of the groove 64 with the port 77 pressure will flow from the rapid traverse pump through channels 74 and 75 to port 77, arcuate groove 64, longitudinal groove 55' to the port 55 from which it will flow through channels 53 and 35 to the right end of the cylinder 24, as viewed in Figure 4. This will cause rapid traverse movement of the saddle inward or toward the column simultaneously causing fluid in the opposite end of the cylinder to be exhausted through channels 34 and 57 to port 59, longitudinal groove 59', arcuate groove 63, port 82 and return channel 84 leading to the reservoir. Downward movement of the valve will establish connection between the pressure port 78 and the groove 60' communicating with the port 60 thereby admitting pressure to the left end of the cylinder 24 through channels 58 and 34 and simultaneously establishing connection of the right end of the cylinder through channels 35 and 54, port 56, groove 56', arcuate groove 64, port 83 and return channel 85. It should now be apparent that after the valve has been moved upward or downward through its length of feed movement that continued movement in the same direction will establish rapid traverse movement in the same direction.

Each main control valve is adapted to be moved axially by suitable power means, which in the present instance comprises a servo-motor 39 having a cylinder 91 integrally connected with the housing of the valve 38. The cylinder is provided with a pressure port 92 connected to a suitable source of pressure, such as the channel 75 of the pump 41. A piston 93 having tubular projections 97 and 98 is slidably mounted in the cylinder. The projections 97 and 98 extend through opposite ends of the cylinder and are slidably mounted therein. A valve plunger 99 is slidably mounted in the longitudinal bore 100 extending through the piston 93 and its projections. A wide annular groove 101 is formed on the piston 93 and is continuously under pressure from the port 92 during the full length of movement thereof. A pair of radial channels 102 and 103 connect this pressure groove with a pair of annular pressure grooves 115 and 116 respectively, formed in the plunger 99. This plunger is also provided with an annular exhaust groove 117 which is connected by means of a diametrical bore to the axial channel 118 formed in the plunger 99 and terminating at the lower end thereof from which the fluid flows through the bore 119 formed in the valve plunger 62 back to the reservoir. The piston 93 divides the cylinder 91 into two chambers 120 and 121 and each chamber is connected by means of a channel 122 and 123 respectively, to annular grooves 124 and 125 formed interiorly of the piston bore. Upon reference to Figure 4, it will be seen that the annular grooves 124 and 125 are each located between a pressure groove and an exhaust groove formed in the plunger 99 so that upon movement of the plunger in either direction one channel will be connected with pressure and the other channel will be connected with exhaust thereby resulting in movement of the piston. By this construction it is possible to move the plunger 99 to control the movement of the piston 93 connected to the valve 62 which in turn has formed thereon a rack portion 126.

A pinion 127 is journaled in bearings 128 formed integral on the housing of the valve 38 by means of shaft 129 having a double crank arm 130 secured to the outer end thereof. As shown in Figure 4, the double crank arm serves to cause downward movement of the lever 131 irrespective of the direction of movement of the rack 126. The lever 131 is connected through link 132 to the pump displacement control lever 133 to vary the pump displacement and thereby the feed rate of the slide being actuated.

Figures 2, 10:
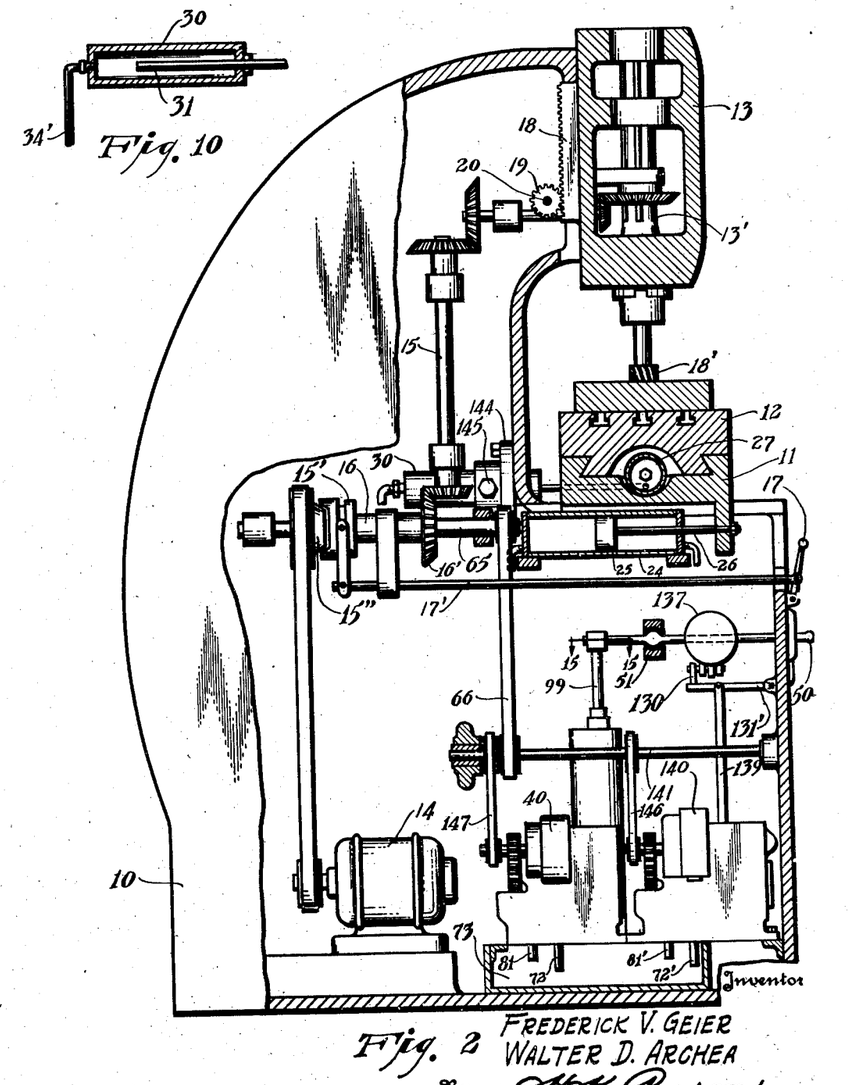
Figure 2 is a section as viewed on the line 2—2 of Figure 1.
Figure 10 is a section on the line 10—10 of Figure 11.

The hydraulic system for the table is the same as the one just described for the saddle and includes the two pumps and the servo-motor operated valve 137 which, as shown in Figure 2, is mounted so that its control plunger 138 moves at right angles to the direction of movement of the saddle control plunger 99.

The plunger 99 is provided with an elongated slot 134 for receiving the end of the control lever 50 which is mounted for universal movement in the ball and socket bearing 51. The end of the lever 50 is slidably mounted in a ball 136 which is in turn mounted for universal movement in the slidable block 135. This permits the valve plunger 99 to be moved upward or downward by the control lever while at the same time permitting lateral movement of the control lever without disturbing the position of the plunger. Lateral movement of the control lever is necessary for operating a similar control valve 137 for the table.

As more particularly shown in Figure 16, the control lever 50 is pivotally mounted in bearing 51 which is located midway between the valve plunger 99 which controls the movement of the saddle and the valve plunger 138 which controls the movement of the table. Attention is invited to the fact that the plungers lie in planes at right angles to each other, as shown in Figures 2 and 16. The control lever 50 is thus common to both plungers and can determine the movement of either one separately or both simultaneously.

As shown in Figure 12, the valve 137 is mounted for movement at right angles to the movement of the saddle control valve plunger. The valve is so positioned that upon movement of the valve plunger 138 outward pressure will flow in the channel 35' to the left end of the cylinder 28, as viewed in Figure 1, causing movement of the table to the right, while movement of the valve inward will cause pressure to flow in the channel 34 and cause movement of the table to the left. As shown in Figure 2, this valve is mounted so that movement of the lever 50 to the right will cause outward movement of the plunger and movement to the left will cause inward movement of the plunger thus making the lever 50 a directional control lever in that it is moved in the direction in which it is desired that the support should move. This valve is also provided with a double crank arm 130 operating through lever 131' and link 139 to control the displacement of the variable feed pump 140, similar to the manner of controlling the pump 40.

The feed pump, rapid traverse pump and booster pump for each group are assembled in a pump unit having a common drive member, such as the belt 146 for the table pump unit and the belt 147 for the saddle pump unit which are in turn constantly driven from the motor 14 through the driving member 66.

It will be noted that the table 12 is mounted upon the movable saddle 11 and that the table cylinder 27 is carried by the saddle and for that reason a flexible connection must be provided between the cylinder 27 and its operating valve 137 to maintain communication during all movements of the saddle. As more particularly shown in Figures 10 and 11 the channel 34' is connected to the end of a small cylinder 30 in which is telescopingly mounted the pipe 31. This pipe is connected to the saddle for movement therewith and communicates with an interior bore 142 formed in the saddle and terminating in an elbow 143 to establish communication with the one end of the table cylinder 127. The channel 35' is provided with a similar telescoping joint 30' for maintaining connection with the left end of the table cylinder. The cylinders 30 and 30' are mounted in flanges 144 secured to the interior of the column wall and provided with set screws 145 for securing the cylinders in place. It will now be evident that the saddle may be adjusted in and out without disturbing the connection to the table and that the table may be fluid actuated in either direction during all positions of the saddle.

The control lever 50 passes through an opening 104 in the front wall of the machine base over which is placed a cover or index plate 105 which is secured to the exterior of the front wall by suitable means, such as cap screws 106. The index plate is provided with a large central opening 107 permitting universal movement of the lever therein. The front face of the plate is suitably marked to indicate that movement of the lever in the direction of a particular indicia will cause movement of the work in the direction indicated. For instance, movement of the lever in a horizontal plane to the operator's right or left will cause movement of the work to the right or left while movement of the lever from a central position in the opening in a vertical plane upward will cause movement of the work in toward the column and downward movement will cause movement of the work outward or away from the column. This lever may also be moved at an angle to either one of these intersecting planes in which case a compound movement will result and the work will be moved at an angle to the axis of movement of either the table or the saddle. From this it will be seen that the lever has universal movement and, during movement in either a vertical or horizontal plane, may be moved slightly laterally in either direction to effect a slight adjustment of the other support. This makes it possible to do profiling work on the machine which requires following an irregular outline with the tool.

Figure 3:
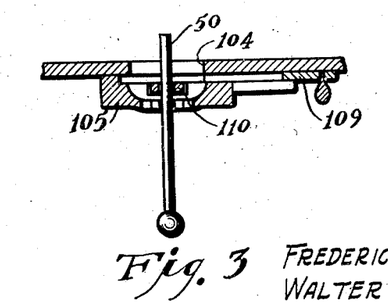
Figure 3 is a detail section on the line 3—3 of Figure 1.

The opening 107 is of sufficient size to permit a sufficient range of universal movement of the control lever and since there is nothing to prevent accidental lateral movement from a particular plane of operation it is possible while effecting movement of one of the slides to cut a straight line that accidental side movement of the control lever might cause the formation of an undesired indentation in the edge of the work. For this reason means have been provided for guiding the control lever in either a horizontal plane or a vertical plane whereby the lever may be moved in either one of these planes to effect a straight line but without the possibility of an accidental side thrust to the lever causing damage to the work piece. A horizontal guide plate 109 and a vertical guide plate 110 are slidably mounted between suitable guides, such as 111, formed integral with the cover plate and each is provided with a median longitudinal slot 112 for receiving the control lever. If the slide 109, as shown in Figure 3, is pushed in to the limit of its movement the slot 112 will act as a horizontal guide for the control lever and thereby prevent any accidental lateral movement in a vertical plane. Likewise, the slide 110 will act as a vertical guide and prevent undesired lateral movement of the control lever in a horizontal plane. These two slides overlap one another, as shown in Figure 3, and it is evident that when both of these slides are moved to their extreme inward position that the control lever 50 will be locked against all movement. By thus being able to lock the control lever against all movement accidental actuation of either slide during changing of the work is thereby prevented. The vertical slide may be maintained in an upward position by suitable detent means, such as the spring pressed detent 113, while outward movement of the slides may be limited by suitable stop means, such as the pin 114.

In the previous embodiment of the invention the two slides actuated were both work supporting slides and in Figure 14 a modification has been shown illustrating the application of the invention to a profiling machine having a horizontal work supporting slide 145 and a laterally movable tool supporting slide 146. In this instance the previously described cylinder 27 may be utilized for actuating the tool supporting slide while a cylinder, similar to the cylinder 24, may be used for actuating the work slide 145 thereby permitting the use of the same control lever and guide plate therefor. In this application of the invention it is not necessary to use the flexible connections in the fluid transmission lines to the upper cylinder.

Attention is invited to the fact that the foregoing embodiments of the invention are to be considered as illustrative only as the invention is equally adaptable for operating any two slides of a machine tool that it is desired to control from a single lever, as for instance, in a knee and column type machine, having a manually adjusted knee, the entire operating mechanism including pumps may be installed in the knee for actuating the saddle and table thereof; or it may be mounted in a column for actuating a vertically movable slide and a transversely movable tool carrier; or other combinations readily apparent to those skilled in the art. From the foregoing description it should now be evident that an hydraulically actuated multiple slide machine tool has been provided in which relative movement between cutter and work at varying rates and directions can be controlled from a single lever.

That which is claimed is:

1. A machine tool having a plurality of slides, hydraulic means for effecting translation thereof, a common control for selectively determining the slide to be actuated, means adapted for independent actuation by said common control for determining the direction of movement of the selected slide, said independent means also being actuable by said common means for determining the rate of movement of the selected slide.

2. A machine tool having a plurality of translatable slides, hydraulic means for effecting said translations, a common rate and direction control member for all of said slides, independent means adapted to be separately actuated by said common control to determine the rate and direction of movement of each slide, said common control having means to jointly actuate said independent means to effect simultaneous movement of a plurality of slides.

3. A milling machine having a saddle and a table translatable in directions normal to each other, independent hydraulic means for effecting translation of each slide including a variable delivery pump, a rate variator for said pump, a common control for selectively coupling either slide with its pump for actuation thereby, and for shifting the respective variator to determine the rate of movement of the actuated slide.

4. A milling machine having a plurality of slides, separate hydraulic means for effecting actuation of each slide including a variable delivery pump, a rate variator coupled therewith, independent means for coupling each slide with its pump for actuation thereby, and separate rate variator actuating means coupled with each of said independent means and adapted upon movement thereof to vary the rate of movement of its respective slide.

5. A milling machine having a plurality of slides movable in angular directions relative to one another, separate hydraulic means for effecting movement of each slide including a variable delivery pump, a rate variator therefor including an hydraulic motor, a common control lever for coupling either slide with its pump for actuation thereby, and mechanical means coupling said common control means with either motor for effecting actuation thereof to vary the rate of delivery of the pump and thereby the rate of movement of the support coupled therewith.

6. A milling machine having a plurality of slides movable in a plurality of directions, separate hydraulic means for effecting movement of each slide including a variable delivery pump, a common control lever movable in a plurality of directions to selectively couple a slide with its pump for actuation thereby, a power actuated rate variator for each pump, said variator being movable in one direction to increase the rate of movement of the actuated slide, and means coupling the variator with said control lever to move the variator in one direction irrespective of the direction of movement of the control lever.

7. A milling machine having a plurality of slides, hydraulic means for effecting translation thereof including a piston and cylinder coupled with each slide, a separate variable delivery pump for each cylinder, a control lever mounted for movement in directions normal to one another to selectively connect a slide for actuation by its respective pump, and removable guides for confining movement of the control lever to a given path to thereby insure movement of only one slide.

8. A milling machine having a plurality of slides, hydraulic means for effecting translation thereof including a separate piston and cylinder coupled with each slide, a separate source of hydraulic pressure for each slide, a control lever mounted for universal movement in different planes for coupling different slides with pressure for actuation thereby, a plurality of removable guides for said control lever for confining the movement of the lever to the control of one slide, all of said guides being positionable to lock the control lever against all movement.

9. A machine tool having multiple slides, a separate source of power for each slide, a separate rate variator for each slide, a common control for said variators, means operatively connecting the control with one variator for unitary movement in a first plane and independent movement in a second plane, and additional means coupling the control member to the other variator for unitary movement in a second plane and independent movement in a first plane whereby the rate of movement of either slide may be selectively varied, said control also being movable in planes at an angle to either of said first named planes for simultaneously varying the rate of movement of said slides.

10. A profiling machine having a rotatable cutter spindle, a work support, a piston and cylinder, means connecting the piston to the work support, a variable displacement feed pump for supplying fluid to the cylinder to effect a feeding movement between the cutter and work, a rapid traverse pump for supplying fluid to the cylinder at a larger volumetric rate than the feed pump to effect quick traverse movements of the work, a longitudinally movable control member having a neutral position, and operating positions upon either side thereof, valve means associated with the member for coupling the feed pump to the cylinder upon initial movement in either direction from its neutral position, means operable by said member upon continued movement from the neutral position to increase the displacement of the feed pump and thereby accelerate movement of the work support, additional valve means associated with the control member and effective upon movement of the control member to its extreme position to disconnect the feed pump and connect the rapid traverse pump to the cylinder, a servo-motor operatively associated with the control member for effecting power movement thereof, and manual means for controlling operation of said servo-motor.

11. A profiling machine having a support, a cutter spindle journaled in the support, a work table mounted on the support for movement transversely of the spindle, means for effecting rotation of the spindle and translation of the support including a prime mover, a first branch transmission extending to the spindle, a clutch for coupling the transmission to the prime mover, a second branch transmission continuously actuated by the prime mover, a fluid operable device for effecting movement of the work support, means actuated by the second branch transmission for supplying fluid under pressure to said device including a variable displacement pump, a rapid traverse pump, means for selectively coupling either pump to said device including a control valve having a neutral position, a servo-motor for actuating said valve, a control lever adjacent said movable support for determining operation of said motor, said valve being related to the lever in such manner that the direction of movement of the lever will determine the direction of movement of said support, said valve having means thereon for coupling the rapid traverse pump to the support upon movement of the lever to its extreme position, and additional manually operable means associated adjacent the first control lever for determining the position of said clutch.

12. A profiling machine having a pair of supports movable transversely of one another for effecting relative movement between work and cutter in a plurality of directions including a first piston and cylinder operatively associated with the first support, a second piston and cylinder operatively associated with the second support, a first and second valve means associated respectively with said cylinders, each of said valve means including a reciprocable control element, said control elements being mounted for movement at right angles to one another, a separate feed pump for supplying fluid to each cylinder under the control of the respective valve means, a control lever pivotally mounted between said control members, means on the control lever at one side of said pivot point for coupling the same to one of said control means for actuation thereof during movement of the lever in one plane, additional means on the lever at the opposite side of said pivot point for connecting the lever to the other of said control means for movement upon actuation of the lever in a second plane at right angles to the first named plane, each of said connecting means being effective during movement of the lever in only one plane whereby each may be independently operated, and means to support the lever for universal movement at said pivot point whereby movement of the lever in other directions than said two planes will effect simultaneous movement of the two supports.

13. A profiling machine having a rotatable cutter spindle, a pair of reciprocable slides, fluid actuable means for shifting the slides, a source of hydraulic pressure, valve means for selectively delivering fluid to the slides, a control lever for said valve means, said lever having a first position wherein all slides are stationary, and operative positions on opposed sides of said first position, flow regulating means associated with the lever whereby continued departure of the lever from said first position will effect acceleration of the selected slide and movement of said lever to its extreme position will effect a quick traverse movement of the selected slide, and means operable during movement of the selected slide at either feed or rapid traverse rate to start and stop the cutter spindle.

14. A machine tool having a pair of slides mounted in guideways extending at right angles to one another, separate power operable means for effecting movement of each slide, a manually operable lever for controlling said means having a first position in which the slides are at rest and movable in a predetermined direction to a second position for effecting movement of one of said slides at a given rate while the other slide remains at rest, said lever also being movable from said second position in a direction normal to its first direction of movement to cause movement of the other slide in a given direction.

15. A machine tool having a pair of slides mounted in guideways extending at right angles to one another, separate power operable means for effecting movement of each slide, a manually operable lever for controlling said means having a first position in which the slides are at rest and movable in a predetermined direction to a second position for effecting movement of one of said slides at a given rate while the other slide remains at rest, said lever also being movable from said second position in opposite directions therefrom and in a plane normal to the plane of the first direction of movement to initiate movement of the other slide in opposite directions.

16. A machine tool having a pair of slides mounted in guideways extending at right angles to one another, separate power operable means for effecting movement of each slide, a manually operable lever for controlling said means having a first position in which the slides are at rest and movable in a predetermined direction to a second position to effect simultaneous movement of both slides at predetermined rates, said lever also being movable in a predetermined direction at an acute angle to its first direction of movement to stop one of said slides.

17. A machine tool having a pair of slides mounted in guideways extending at right angles to one another, separate power operable means for effecting movement of each slide, a manually operable lever for controlling said means having a first position in which the slides are at rest and movable in a predetermined direction to a second position to cause a feeding movement of one of said slides, said lever also being movable from said second position in a direction at right angles to its first direction of movement to initiate a rapid traverse movement of the other slide.

18. A machine tool having a pair of slides movable in guideways at right angles to one another, power operable means for effecting movement of said slides at feed or rapid traverse rates, a control lever movable in paths at right angles to one another for individually controlling the rate and direction of movement of said slides, said lever having an additional movement along a path which bisects the intersecting angle of the first two paths to effect simultaneous movement of both slides at a rapid traverse rate and means to move the lever from any point in the last named path and at right angles to either of said first named paths to stop movement of one of said slides.

19. In a profiling machine having a cutter support and a work support, power operable means for effecting relative movement between said supports in a plurality of different angular paths, independent power sources for supplying the respective means, and means to control the rate of operation of each of said power operable means by their respective power sources including a directional control member, and a plurality of means jointly and severally actuable by said member, whereby directional movements thereof cause corresponding directional resultant movements between the slides, and increase or decrease in the extent of a given directional movement causing a corresponding increase or decrease in the rate of said resultant movement.

20. In a profiling machine having a rotatable cutter, the combination of a plurality of slides for effecting resultant movement between a work piece and the cutter in different angular paths whereby the work may be outlined in accordance with a predetermined pattern, power operable means for moving each slide, independent sources of power for activating the respective means including rate control means, and a common control operatively connected to said rate control means having a prescribed position for adjusting said rate control means to zero rate, and additional radial positions for adjusting one or both of said rate control devices to cause several or joint movement of the slides respectively in accordance with the desired resultant direction of movement between the cutter and work.

21. A profiling machine having a pair of slides movable in transverse directions for effecting relative movement between a cutter and a work piece supported by the respective slides, independent hydraulic means for effecting translation of each slide including a variable delivery pump, a rate variator for each pump, a common control operatively connected to said variators for independent or simultaneous adjustment thereof to determine the resultant rate and direction of movement between the cutter and work whereby said common control may be utilized to determine the pattern outline to be cut in the work.

22. In a profiling machine having a cutter support and a work support, hydraulic means for effecting relative movement between said supports in various angularly related directions for reproducing desired profiles in the work including a first and second hydraulic motor for effecting movement of the respective supports in primary directions angularly related to one another, joint actuation of said motors causing a resultant movement at an angle to said primary directions, independent means for delivering an operating hydraulic flow to the respective motors for actuation thereof without retroactive effects therebetween, and common means for jointly or severally varying the volume of said flows to determine the resultant direction of relative movement between the cutter and work piece.

23. In a profiling machine having a cutter support and a work support, hydraulic means for effecting relative movement between said supports in various angularly related directions for reproducing desired profiles in the work including a first and second hydraulic motor for effecting movement of the respective supports in primary directions angularly related to one another, joint actuation of said motors causing a resultant movement at an angle to said primary directions, independent pressure fluid sources for delivering an operating hydraulic flow to the respective motors, common means for controlling the volumetric ratio of said flows to determine the resultant direction of movement between the cutter and work while maintaining the rate of said movement constant, said means also being operable to change the rate of the resultant movement while maintaining the volumetric ratio constant.

FREDERICK V. GEIER.
WALTER D. ARCHEA.